Patented Aug. 22, 1933

1,923,948

UNITED STATES PATENT OFFICE 1,923,948

PROCESS OF EXTRACTING GOLD FROM ITS ORES

Paul A. Neumann, Chicago, Ill.

No Drawing. Application December 16, 1931
Serial No. 581,520

2 Claims. (Cl. 75—185)

The invention relates to a process of extracting gold from its ores and has for its object to simplify the process now in use, to make it considerably cheaper, and to improve the extraction.

The usual process of extracting gold from its ores consists in treating the pulverized ores with a solvent for gold, as a rule with a cyanide solution. The solution is then separated from the sands and slimes, and these are washed in order to lose as little as possible of the valuable gold solution with the tailings. From the clear solution the gold is precipitated by some precipitating agent, as a rule zinc shaving or zinc dust, or aluminium dust. The precipitated gold slimes are washed, pressed and molten.

In my process the ores are treated with cyanide solution or some other solvent for gold in the ordinary way. But I do not separate the gold bearing solution from the sands and slimes before precipitating the dissolved gold. The zinc dust, or whatever precipitating agent may be used, is added to the pulp when the gold of the ores has been dissolved. There is no filtering. The gold is precipitated within the pulp. To recover the precipitated gold from the pulp I use centrifugal force with the aid of mercury.

The pulp consists of the pulverized leached ore, the precipitated gold, and the solvent out of which the gold has been precipitated. The gold is present in the pulp in the very finest distribution, making it impossible to separate it from the sands and slimes by gravity, as the fine gold settles slower than most of the sands. The separation, however, can easily be effected by centrifugation, as we have to do with materials of widely different specific gravity.

By the use of an appropriate centrifugal containing mercury it is possible to throw into the mercury all the gold contained in the pulp, as the gold is much heavier than the mercury. From the mercury the gold can be recovered in the usual way.

The gold, being forced into the mercury, will, as a rule, be amalgamated. The amalgamation, however, is only an accidental fact, not the object of centrifuging the pulp, its main object being the separation of the precipitated gold from the pulp. If the gold were in a non-amalgamable state, the separation from the pulp would be accomplished just as well.

It may appear strange that the pulverized ore is not sent through the centrifuge directly without first dissolving and reprecipitating the gold. In many cases this direct centrifugation will be preferable. But often the gold occurs in an extremely fine state in microscopical cracks in the sand grains, so that the specific gravity of the grain of sand containing the gold is lower than that of mercury, whereby such grain of sand would not be pressed into the mercury but might be lost with the tailings. The solvent, however, will leach the gold out of all cracks.

I know that processes of extracting gold from its ores are known in which the gold is first dissolved and then re-precipitated in the pulp. In these processes the precipitated gold is amalgamated in some way or other by agitation with mercury. The drawbacks of these processes are, first, that it is extremely difficult to bring every particle of the gold into contact with mercury, and, second, that by the agitation or by the other means applied for this purpose the mercury and also the amalgam formed is broken up into minute globules, so small that they settle between the sands and slimes, making it impossible to separate them by gravity.

My process differs from all these inasmuch as, after dissolving and re-precipitating the gold, I separate it from the rest of the pulp not by amalgamation and gravity, but by forcing it into mercury under centrifugal pressure, whereby also a precipitate of non-amalgamable gold would be saved.

The advantages of my process are:

By treating the ore with a solvent for gold all the gold, even that hidden in the finest cracks of the ore, is dissolved.

By adding a precipitating agent to the pulp containing the gold bearing solution I precipitate all the gold out of the solution.

By subjecting the pulp with the precipitated gold to the action of centrifugal force in an appropriate centrifuge containing mercury a rapid and complete separation of the precipitated gold from the rest of the pulp is effected, saving thereby the heavy costs of separating the leached ore from the solution and of washing the tailings, and avoiding at the same time the losses caused by leaving gold bearing solution in the tailings.

Combining these three operations into a continuous process, I obtain a greatly increased extraction of gold at much reduced costs.

I claim:

1. The process of extracting gold from its ores which consists in dissolving the gold from the pulverized ores with a solvent, then precipitating the dissolved gold by a precipitating agent without having separated the solution from the ore, and finally separating the precipitated gold from the solvent and the ore by forcing the gold into mercury under centrifugal pressure.

2. The process of extracting gold from its ores which consists in dissolving the gold from the pulverized ores with a cyanide solution, then precipitating the dissolved gold by base metals without having separated the solution from the ore, and finally separating the precipitated gold from the solvent and the ore by forcing the gold into mercury under centrifugal pressure.

PAUL A. NEUMANN.